(12) United States Patent
Yamamoto et al.

(10) Patent No.: US 10,105,807 B2
(45) Date of Patent: Oct. 23, 2018

(54) ABNORMALITY DIAGNOSIS DEVICE FOR MACHINE TOOL, AND ABNORMALITY DIAGNOSIS METHOD

(71) Applicant: MITSUBISHI HEAVY INDUSTRIES MACHINE TOOL CO., LTD., Ritto, Shiga (JP)

(72) Inventors: Hideaki Yamamoto, Tokyo (JP); Koji Iwata, Tokyo (JP)

(73) Assignee: MITSUBISHI HEAVY INDUSTRIES MACHINE TOOL CO., LTD., Shiga (JP)

( * ) Notice: Subject to any disclaimer, the term of this patent is extended or adjusted under 35 U.S.C. 154(b) by 107 days.

(21) Appl. No.: 14/761,991

(22) PCT Filed: Mar. 5, 2014

(86) PCT No.: PCT/JP2014/055625
§ 371 (c)(1),
(2) Date: Jul. 20, 2015

(87) PCT Pub. No.: WO2014/136835
PCT Pub. Date: Sep. 12, 2014

(65) Prior Publication Data
US 2015/0352679 A1  Dec. 10, 2015

(30) Foreign Application Priority Data

Mar. 7, 2013 (JP) ................ 2013-044880

(51) Int. Cl.
*B23Q 17/00* (2006.01)
*B23Q 17/22* (2006.01)
*G05B 19/4061* (2006.01)

(52) U.S. Cl.
CPC ........... *B23Q 17/00* (2013.01); *B23Q 17/007* (2013.01); *B23Q 17/2208* (2013.01);
(Continued)

(58) Field of Classification Search
None
See application file for complete search history.

(56) References Cited

U.S. PATENT DOCUMENTS

| 2008/0033695 | A1* | 2/2008 | Sahara | G01H 1/003 702/185 |
| 2012/0221137 | A1* | 8/2012 | Kettemer | G05B 19/4061 700/108 |
| 2013/0149062 | A1* | 6/2013 | Kimura | B23Q 15/06 409/80 |

FOREIGN PATENT DOCUMENTS

| JP | 11-197979 A | 7/1999 |
| JP | 2009-80752 A | 4/2009 |

(Continued)

OTHER PUBLICATIONS

Zhang Wenyue, Yang Junyue, Ge Yanjun, Design of the Displacement Detection System for Magnetic Bearing, In:Proceedings of 14th Youth Conference on Communication, Oct. 2009, Scientific Research Publishing, USA.*

(Continued)

*Primary Examiner* — Kenneth M Lo
*Assistant Examiner* — Istiaque Ahmed
(74) *Attorney, Agent, or Firm* — Birch, Stewart, Kolasch & Birch, LLP

(57) ABSTRACT

Provided is an abnormality diagnosis device for a machine tool, and an abnormality diagnosis method, whereby it is possible to diagnose the degree of damage to a spindle system due to a collision. An abnormality diagnosis device (40) for a machine tool (1) has: a displacement sensor (36) for detecting the amount of displacement of a spindle bearing (30); an acceleration sensor (38) for detecting the acceleration of a ram (28); a collision determination unit (46) for determining whether the ram or a spindle (32) has collided with a work piece, on the basis of at least the (Continued)

amount of displacement of the spindle bearing detected by the displacement sensor or the acceleration of the ram detected by the acceleration sensor; and a damage determination unit (50) for determining the degree of damage to the spindle bearing on the basis of at least the amount of displacement of the spindle bearing, the acceleration of the ram, or a frequency characteristic of vibration of the ram due to rotation of the spindle obtained from the acceleration of the ram, when the collision determination unit determines that the ram or the spindle has collided with the work piece.

3 Claims, 8 Drawing Sheets

(52) U.S. Cl.
CPC ............... *G05B 19/4061* (2013.01); *G05B 2219/37388* (2013.01); *G05B 2219/42328* (2013.01); *G05B 2219/50186* (2013.01)

(56) References Cited

FOREIGN PATENT DOCUMENTS

| | | |
|---|---|---|
| JP | 2011-62753 A | 3/2011 |
| JP | 4897632 B2 | 3/2012 |
| JP | 2012-67907 A | 4/2012 |
| JP | 2012-160180 A | 8/2012 |

OTHER PUBLICATIONS

English translation of the Written Opinion of the International Searching Authority, issued in PCT/JP2014/055625, dated Apr. 22, 2014.
International Search Report, issued in PCT/JP2014/055625, dated Apr. 22, 2014.
Written Opinion of the International Searching Authority, issued in PCT/JP2014/055625, dated Apr. 22, 2014.
Office Action dated Dec. 5, 2016 in corresponding Japanese Application No. 2013-044880 with an English Translation.

\* cited by examiner

ABNORMALITY DIAGNOSIS DEVICE FOR MACHINE TOOL, AND ABNORMALITY DIAGNOSIS METHOD

TECHNICAL FIELD

The present invention relates to an abnormality diagnosis device and an abnormality diagnosis method for a machine tool, and particularly, relates to an abnormality diagnosis device and an abnormality diagnosis method for a machine tool in which a tool for machining a work piece is attached to a spindle and the spindle is supported by a bearing.

BACKGROUND ART

In the related art, a machine tool including a spindle supported by a bearing is used. In this machine tool, various machining with respect to a work piece is performed by relatively moving a tool attached to the spindle and the work piece. In this way, when the tool attached to the spindle and the work piece relatively move toward each other, due to input errors of a Numerical Control (NC) program defining a movement direction or an amount of movement of the tool or the work piece, or operation errors of an operator, the spindle, the tool, the work piece or the like collides with each other, and thus, the machine tool may be damaged.

Accordingly, a control device of a machine tool for determining a degree of damage to a machine tool due to a collision and for determining whether or not it is necessary to exchange parts of a machine is suggested. For example, in a control device of a machine tool disclosed in PTL 1, when a table or a load on the table collides with a spindle or the like while the machine tool is operated, a magnitude of impact with respect to a ball screw is determined by calculating a load of collision applied to the ball screw driving the table and comparing the calculated load and the reference value set in advance.

CITATION LIST

Patent Literature

[PTL 1] Japanese Patent No. 4897632

SUMMARY OF INVENTION

Technical Problem

In a collision occurring in a machine tool, occurrence frequency in a collision of a spindle system is particularly high. In the collision of the spindle system, not only is a tool attached to a spindle or the spindle itself damaged, but also a bearing supporting the spindle, a motor rotating the spindle, or a support structure supporting the spindle via the bearing is damaged, and thus, a large amount of damage easily occurs. Accordingly, it is necessary to accurately determine a degree of damage to the spindle system due to the collision.

However, in the control device of the machine tool disclosed in PTL 1, a diagnosis with respect to damage of a driving system driving the table due to the collision is performed, and diagnosis with respect the degree of damage to the spindle system described above due to the collision cannot be performed.

The present invention is made to solve the above-described problems of the related art, and an object thereof is to provide an abnormality diagnosis device and an abnormality diagnosis method for a machine tool capable of diagnosing the degree of damage to the spindle system due to the collision.

Solution to Problem

In order to achieve the object, according to a first aspect of the present invention, there is provided an abnormality diagnosis device for a machine tool in which a tool for machining a work piece is attached to a spindle, the spindle is supported by a bearing, and the bearing is supported by a support structure, including: bearing displacement amount detection means for detecting an amount of displacement of the bearing; acceleration detection means for detecting an acceleration of the support structure; collision determination means for determining whether the support structure or the spindle collides with the work piece, on the basis of at least the amount of displacement of the bearing detected by the bearing displacement amount detection means or the acceleration of the support structure detected by the acceleration detection means; and damage determination means for determining a degree of damage to the bearing, on the basis of at least the amount of displacement of the bearing, the acceleration of the support structure, or frequency characteristics of a vibration of the support structure due to a rotation of the spindle obtained from the acceleration of the support structure, when the collision determination means determines that the support structure or the spindle collides with the work piece.

In the present invention configured in this way, since the collision determination means determines whether or not the spindle system collides with the work piece, on the basis of the amount of displacement of the bearing which is deformed by the collision of the spindle system, or the acceleration of the support structure which is moved by the collision of the spindle system, it is possible to directly determine presence or absence of the collision. In addition, since the damage determination means determines the degree of damage to the bearing, on the basis of the amount of displacement of the bearing changed according to the degree of damage to the bearing, the acceleration of the support structure, or the frequency characteristics of the vibration of the support structure, it is possible to securely determine the degree of damage to the bearing due to the collision of the spindle system. Particularly, since the damage determination means determines the degree of damage to the bearing on the basis of the amount of displacement of the bearing, it is possible to directly determine the degree of damage to the bearing. In addition, since the damage determination means determines the degree of damage to the bearing on the basis of the frequency characteristics of the vibration of the support structure due to the rotation of the spindle, it is possible to strictly determine the degree of damage to the bearing from various aspects such as a base frequency or a peak value.

In addition, in the present invention, preferably, the abnormality diagnosis device for a machine tool includes support structure deformation amount estimation means for estimating an amount of deformation of the support structure, in which the damage determination means determines the degree of damage to the support structure, on the basis of at least the acceleration of the support structure detected by the acceleration detection means or the amount of deformation of the support structure estimated by the support structure deformation amount estimation means, when the collision determination means determines that the collision of the support structure or the spindle occurs.

In the present invention configured in this way, since the damage determination means determines the degree of damage to the support structure on the basis of the acceleration of the support structure changed according to the degree of damage to the support structure or the amount of deformation of the support structure, it is possible to securely determine the degree of damage to the support structure due to the collision of the spindle system. Particularly, since the damage determination means determines the degree of damage to the support structure on the basis of the amount of deformation of the support structure, it is possible to directly determine the degree of damage to the support structure.

Moreover, in the present invention, preferably, the machine tool includes a moving body which moves in a direction orthogonal to an axial direction of the spindle, and position detection means for detecting a position of the moving body, and the support structure deformation amount estimation means estimates the amount of deformation of the support structure, on the basis of a positional change of the moving body detected by the position detection means.

In the present invention configured in this way, since the support structure deformation amount estimation means estimates the amount of deformation of the support structure on the basis of the positional change of the moving body when the moving body collides with the spindle system, it is possible to securely estimate the amount of deformation of the support structure without using a sensor which directly detects the amount of deformation of the support structure.

In addition, according to a second aspect of the present invention, there is provided an abnormality diagnosis method for a machine tool in which a tool for machining a work piece is attached to a spindle, the spindle is supported by a bearing, and the bearing is supported by a support structure, including: a step of detecting an amount of displacement of the bearing; a step of detecting an acceleration of the support structure; a step of determining whether the support structure or the spindle collides with the work piece, on the basis of at least the detected amount of displacement of the bearing or the detected acceleration of the support structure; and a step of determining a degree of damage to the bearing, on the basis of at least the detected amount of displacement of the bearing, the detected acceleration of the support structure, or frequency characteristics of the vibration of the support structure due to the rotation of the spindle obtained from the acceleration of the support structure, when the collision determination means determines that the support structure or the spindle collides with the work piece.

Advantageous Effects of Invention

According to an abnormality diagnosis device and an abnormality diagnosis method of a machine tool of the present invention, it is possible to diagnosis a degree of damage to a spindle system due to the collision.

DESCRIPTION OF EMBODIMENTS

Hereinafter, with reference to the accompanying drawings, an abnormality diagnosis device and an abnormality diagnosis method according to an embodiment of the present invention will be described.

Figure 1:
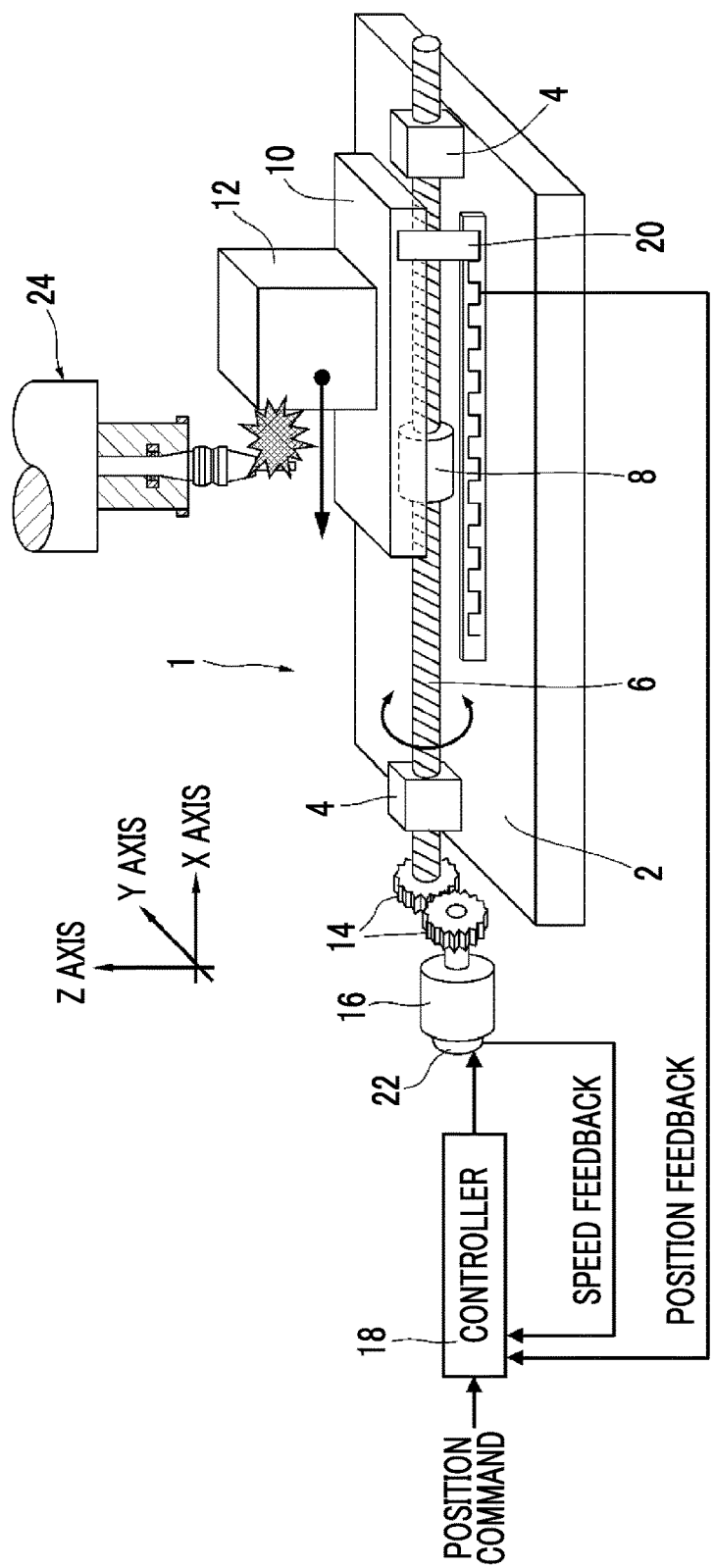
FIG. 1 is a schematic perspective view of a machine tool to which an abnormality diagnosis device according to an embodiment of the present invention is applied.
Figure 2:
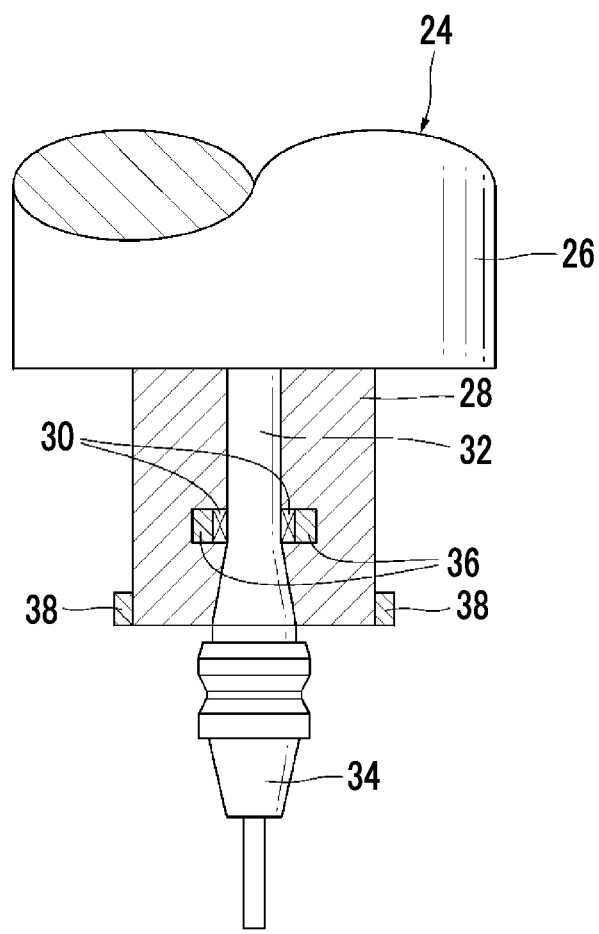
FIG. 2 is a partially enlarged side view of a spindle portion of the machine tool to which the abnormality diagnosis device according to the embodiment of the present invention is applied.

First, with reference to FIGS. 1 and 2, a machine tool, to which the abnormality diagnosis device according to the embodiment of the present invention is applied, will be described. FIG. 1 is a schematic perspective view of the machine tool to which the abnormality diagnosis device according to the embodiment of the present invention is applied. FIG. 2 is a partially enlarged side view of a spindle portion of the machine tool to which the abnormality diagnosis device according to the embodiment of the present invention is applied.

As shown in FIG. 1, a reference numeral 1 indicates the machine tool, and the machine tool 1 includes a bed 2 which is installed on a floor surface. A plurality of brackets 4 are fixed to the upper surface of the bed 2. A support bearing is attached to each bracket 4, and both end portions of a ball screw 6 are rotatably supported by the support bearings.

In descriptions below, a longitudinal axial direction of the ball screw 6 is defined as an X axis direction, a direction orthogonal to an X axis in a horizontal surface is defined as a Y axis direction, and a vertical direction is defined as a Z axis direction.

A nut 8 is screwed to a screw portion of the ball screw 6 positioned between the bracket 4, and a table 10 is fixed to the nut 8. A work piece 12 which is an object to be processed by the machine tool 1 is installed on the upper surface of the table 10.

A motor 16 is connected to the ball screw 6 via a reduction gear 14, and thus, a driving force of the motor 16 is transmitted to the ball screw 6 via the reduction gear 14. The motor 16 is controlled by a controller 18.

In addition, a position detector 20 which detects the position of the table 10 is provided in the vicinity of the table 10. Moreover, a pulse coder 22 which detects a rotational speed of the motor 16 is attached to the motor 16.

The controller 18 drives the motor 16 on the basis of a position command indicating the position of the table 10, a position feedback output from the position detector 20 detecting the position of the table 10, and a speed feedback output from the pulse coder 22 detecting the rotational speed of the motor 16, and controls a movement speed, the position, or the like of the table 10.

In addition, the machine tool 1 includes a gate-shaped column (not shown) which is disposed across the bed 2, and a spindle portion 24 is attached to the column. FIG. 2 is the partially enlarged side view of the spindle portion 24 of the machine tool 1 to which the abnormality diagnosis device for the machine tool according to the embodiment of the present invention is applied.

As shown in FIG. 2, the spindle portion 24 includes a saddle 26. The saddle 26 is attached to the column so as to be movable in the Y axis direction. A ram 28 is supported by the saddle 26 so as to move straight along the Z axis direction.

A spindle bearing 30 is provided inside the ram 28, and a spindle 32 is rotatably supported about the Z axis by the spindle bearing 30. The spindle 32 protrudes downward along the Z axis direction from the lower end of the ram 28, and a tool 34 is mounted on the tip portion of the spindle 32.

Next, an abnormality diagnosis device 40 will be described. A displacement sensor 36 which detects an amount of displacement (amount of deformation) of the spindle bearing 30 is attached to the spindle bearing 30. As the displacement sensor 36, a strain gauge or a piezoelectric element is used.

Moreover, an acceleration sensor 38 which detects the acceleration sensor of the lower end portion of the ram 28 is attached to the lower end portion of the ram 28 which is a support structure supporting the spindle 32 via the spindle bearing 30. The acceleration sensor 38 is a three-axis acceleration sensor which can detect the accelerations of three directions such as the X axis, the Y axis, and the Z axis.

When the controller 18 drives the motor 16 on the basis of the position command indicating the position of the table 10, the position feedback output from the position detector 20 detecting the position of the table 10, and a speed feedback output from the pulse coder 22 detecting the rotational speed of the motor 16, the driving force of the motor 16 is transmitted to the ball screw 6 via the reduction gear 14, and thus, the ball screw 6 is rotated. Accordingly, the table 10 moves straight along the axial direction (X axis direction) of the ball screw 6 along with the nut 8, and thus, the work piece 12 installed on the table 10 moves to a desired position.

Due to operation errors of an operator, if the work piece 12 positioned on the table 10 collides with the spindle portion 24, the ram 28 or the spindle 32 is deformed due to the impact, and the spindle bearing 30 is also deformed due to the deformation of the spindle 32. The displacement sensor 36 detects the amount of the displacement of the spindle bearing 30, and the acceleration due to the deformation of the ram 28 is detected by the acceleration sensor 38.

Figure 3:
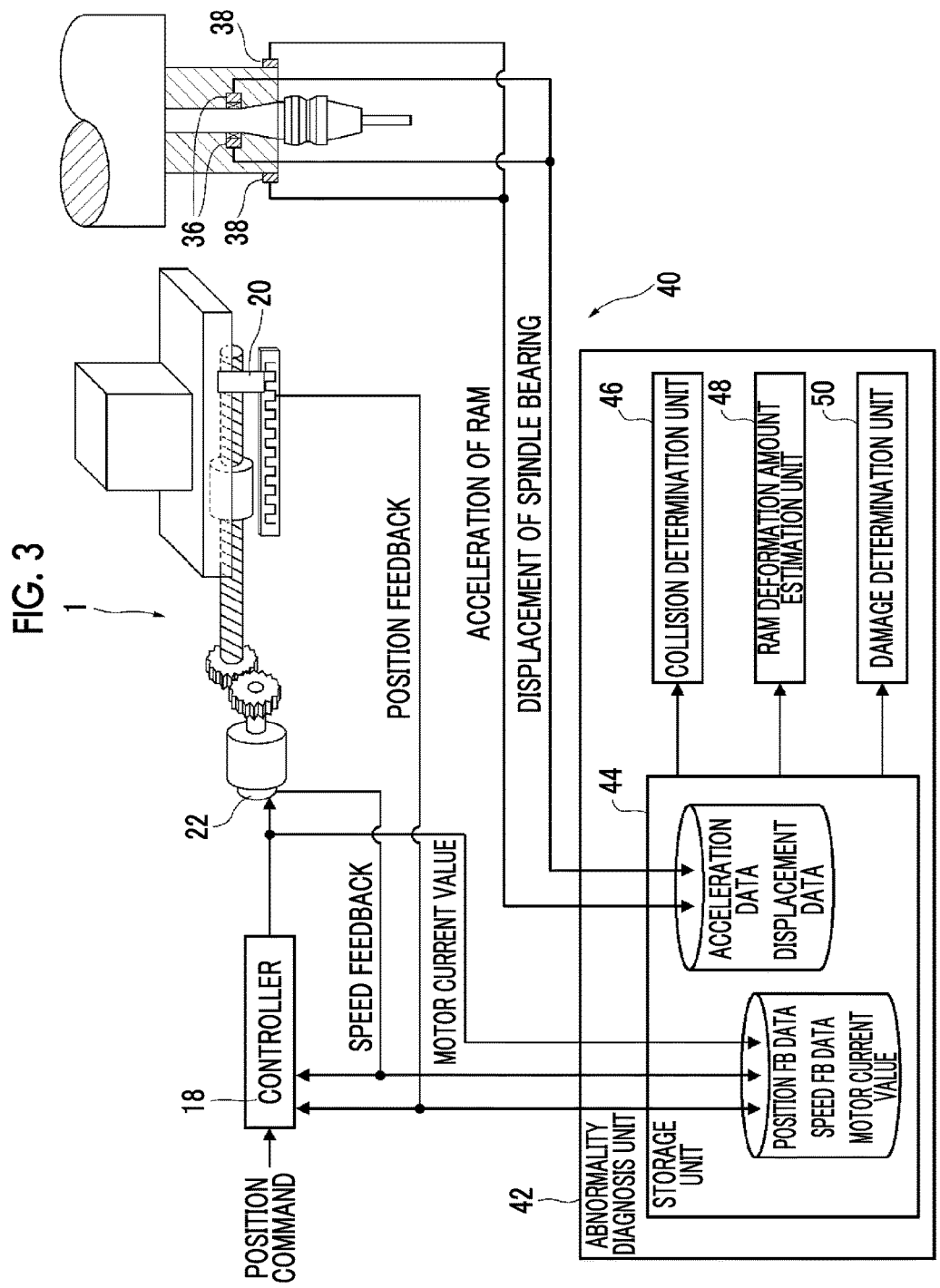
FIG. 3 is a block diagram of the abnormality diagnosis device according to the embodiment of the present invention.

Next, an electrical configuration of the abnormality diagnosis device 40 according to the embodiment of the present invention will be described with reference to FIG. 3. FIG. 3 is a block diagram of the abnormality diagnosis device 40 according to the embodiment of the present invention.

As shown in FIG. 3, the abnormality diagnosis device includes the displacement sensor 36, the acceleration sensor 38, and an abnormality diagnosis unit 42 for diagnosing abnormality of the machine tool 1. The abnormality diagnosis unit 42 diagnoses the abnormality of the machine tool 1, on the basis of the amount of displacement of the spindle bearing 30 detected by the displacement sensor 36, the acceleration of the ram 28 detected by the acceleration sensor 38, the position feedback output from the position detector 20, the speed feedback output from the pulse coder 22, and a motor current value output from the controller 18.

The abnormality diagnosis unit 42 includes a storage unit 44 which stores displacement data of the spindle bearing 30 detected by the displacement sensor 36, acceleration data of the ram 28 detected by the acceleration sensor 38, position feedback data output from the position detector 20, speed feedback data output from the pulse coder 22, and the motor current value output from the controller 18.

In addition, the abnormality diagnosis unit 42 includes a collision determination unit 46 which determines the presence or absence of a collision of the spindle portion 24 on the basis of the displacement data of the spindle bearing 30 or the acceleration data of the ram 28 stored in the storage unit 44, a ram deformation amount estimation unit 48 which estimates the amount of deformation of the ram 28 due to the collision, and a damage determination unit 50 which determines the degree of damage to the spindle bearing 30, the ram 28, and the saddle 26 on the basis of the displacement data of the spindle bearing 30, the acceleration data of the ram 28 stored in the storage unit 44, or the like.

Next, each processing step which is performed by the abnormality diagnosis device 40 according to the embodiment of the present invention will be described with reference to FIGS. 4 to 6.

Figure 4:
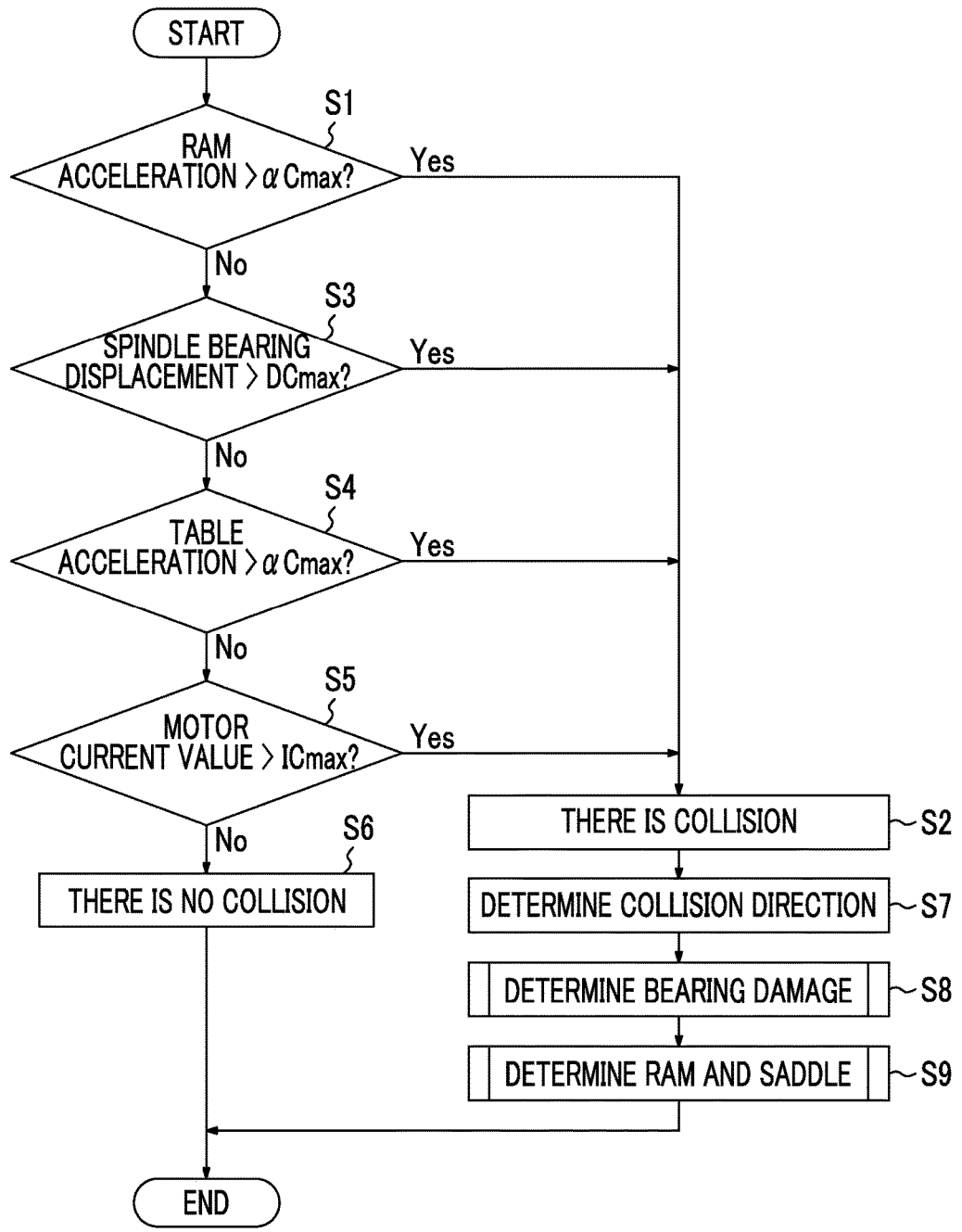
FIG. 4 is a flow chart of abnormality diagnosis processing which is performed by the abnormality diagnosis device according to the embodiment of the present invention.

FIG. 4 is a flow chart of abnormality diagnosis processing which is performed by the abnormality diagnosis device 40 according to the embodiment of the present invention. This abnormality diagnosis processing is performed when machining of the work piece 12 by means of the machine tool 1 starts.

As shown in FIG. 4, when the abnormality diagnosis processing starts, in Step S1, the collision determination unit 46 determines whether or not the acceleration of the ram 28 detected by the acceleration sensor 38 exceeds $\alpha Cmax$ (m/s$^2$). $\alpha Cmax$ is the maximum acceleration when the ball screw 6 is rotated by the motor 16 and the table 10 is moved by the rotation of the ball screw 6, and is defined by a numerical control parameter for controlling the position of the table 10. In a normal use condition in which a collision does not occur, it is not considered that the table 10 moves at the acceleration exceeding $\alpha Camx$. Accordingly, when the acceleration of the ram 28 exceeds $\alpha Cmax$, the collision determination unit 46 proceeds to Step S2, and determines whether or not there is a collision with respect to the spindle portion 24.

On the other hand, when the acceleration of the ram 28 does not exceed $\alpha Cmax$ (the acceleration of the ram 28 is $\alpha Cmax$ or less), the collision determination unit 46 proceeds to Step S3, and determines whether or not the amount of displacement of the spindle bearing 30 exceeds DCmax (mm). DCmax is the maximum amount of displacement of the spindle bearing 30 which is assumed when the collision with respect to the spindle portion 24 does not occur, and is set in advance. When the amount of displacement of the spindle bearing 30 exceeds DCmax, the collision determination unit 46 proceeds to Step S2, and determines whether or not there is a collision with respect to the spindle portion 24.

Meanwhile, when the amount of displacement of the spindle bearing 30 does not exceed DCmax (when the amount of displacement of the spindle bearing 30 is DCmax or less), the collision determination unit 46 proceeds to Step S4 and determines whether or not the acceleration of the table 10 exceeds $\alpha Cmax$. Specifically, the collision determination unit 46 calculates the acceleration of the table 10 on the basis of the speed feedback data and the position feedback data, and when the calculated acceleration of the table 10 exceeds αCmax, the collision determination unit 46 proceeds to Step S2 and determines whether or not there is a collision with respect to the spindle portion 24.

Meanwhile, when the acceleration of the table 10 does not exceed αCmax (when the acceleration of the table 10 is αCmax or less), the collision determination unit 46 proceeds to Step S5 and determines whether or not the current value of the motor 16 exceeds ICmax (A). ICmax is the maximum current value of the motor 16 which is assumed when a collision with respect to the spindle portion 24 does not occur, and is set in advance. When the current value of the motor 16 exceeds ICmax, the collision determination unit 46 proceeds to Step S2 and determines whether or not there is a collision with respect to the spindle portion 24.

Meanwhile, when the current value of the motor 16 does not exceed ICmax (when the current value of the motor 16 is ICmax or less), the collision determination unit 46 proceeds to Step S6 and determines whether or not there is a collision with respect to the spindle portion 24. After Step S6, the abnormality diagnosis unit 42 ends the abnormality diagnosis processing.

In Step S2, after the collision determination unit 46 determines that there is a collision with respect to the spindle portion 24, the collision determination unit 46 proceeds to Step S7 and determines the direction of the collision. Specifically, the collision determination unit 46 specifies the occurrence of a collision with respect to the spindle portion 24 on the basis of the position feedback data, the speed feedback data, or the motor current value. For example, the collision determination unit 46 specifies a point in time, when the movement speed of the table 10 is changed, on the basis of the position feedback data or the speed feedback data, and the point in time is set to the time of the collision. In addition, the collision determination unit 46 specifies the movement direction of the table 10 during the collision, and the movement direction is set to a collision direction. Alternatively, the collision determination unit 46 determines the collision direction on the basis of each acceleration in the X axis, Y axis, and Z axis directions of the ram 28 detected by the acceleration sensor 38.

Next, the damage determination unit 50 proceeds to Step S8, and the damage determination unit 50 determines the degree of damage to the spindle bearing 30 on the basis of the displacement data of the spindle bearing 30, the acceleration data of the ram 28, or the like (bearing damage determination processing). Subsequently, the damage determination unit 50 proceeds to Step S9, and the damage determination unit 50 determines the degrees of damage of the ram 28 and the saddle 26 on the basis of the displacement data of the spindle bearing 30, the acceleration data of the ram 28, or the like (ram and saddle damage determination processing). After Step S9, the abnormality diagnosis unit 42 ends the abnormality diagnosis processing.

Next, the bearing damage determination processing which is performed by the damage determination unit 50 in Step S8 of the abnormality diagnosis processing will be described. FIG. 5 is a flow chart of the bearing damage determination processing.

Figure 5:
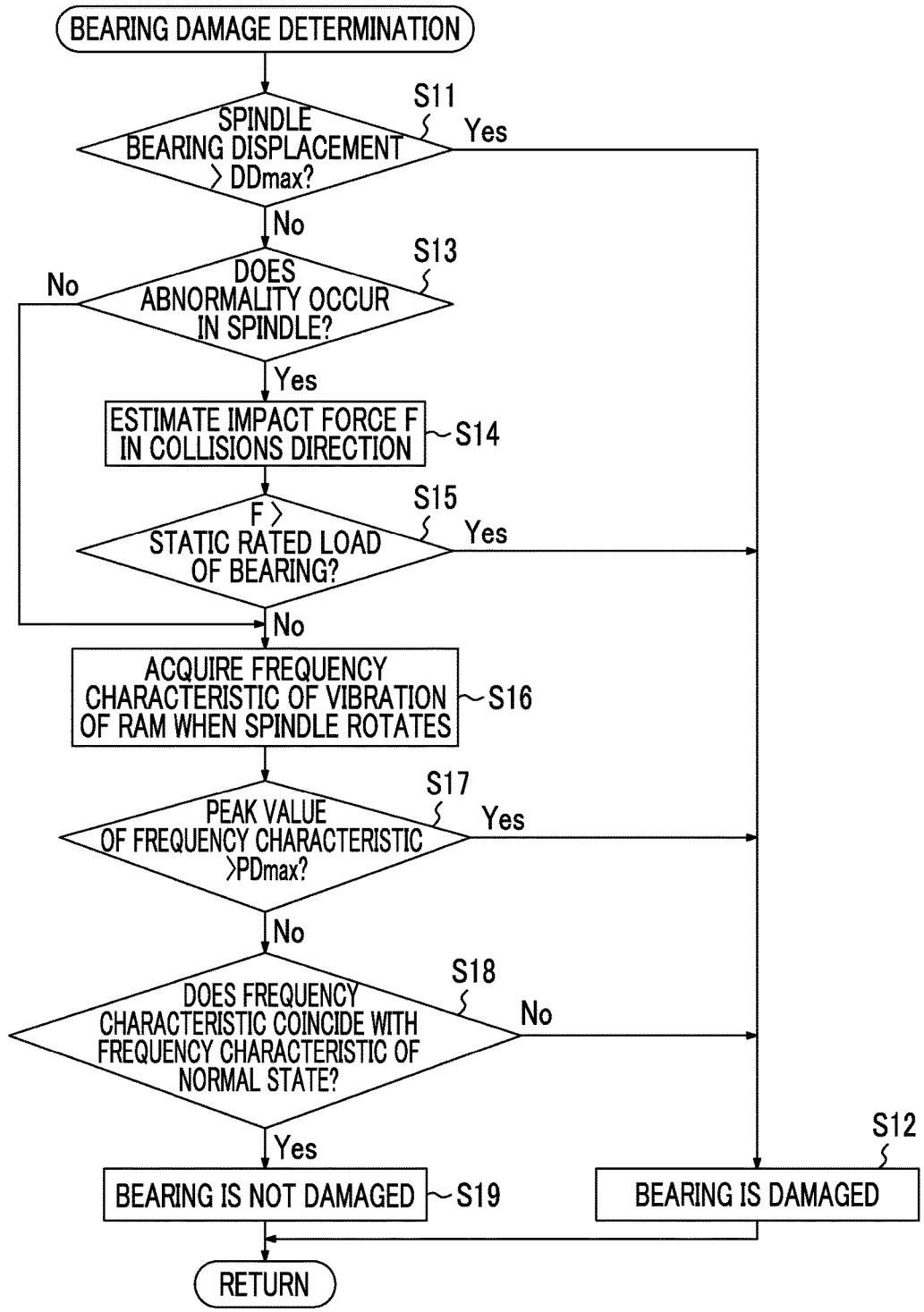
FIG. 5 is a flow chart of bearing damage determination processing which is performed by the abnormality diagnosis device according to the embodiment of the present invention.

As shown in FIG. 5, the bearing damage determination processing starts, and in Step S11, the damage determination unit 50 determines whether or not the amount of displacement of the spindle bearing 30 exceeds DDmax (mm). DDmax is the maximum amount of displacement of the spindle bearing 30 which is assumed when the spindle bearing 30 is not damaged, and is set in advance. When the amount of displacement of the spindle bearing 30 exceeds DDmax, the damage determination unit 50 proceeds to Step S12, and determines that the spindle bearing 30 is damaged.

Meanwhile, when the amount of displacement of the spindle bearing 30 does not exceed DDmax (when the amount of displacement of the spindle bearing 30 is DDmax or less), the damage determination unit 50 proceeds to Step S13 and determines whether or not abnormality occurs in the spindle system. Specifically, when rotation abnormality or rotation loss of the spindle 32, or overload of the motor rotating the spindle 32 is detected by a controller controlling the rotation of the spindle 32, an alarm denoting that abnormality occurs in the spindle system is output, and the damage determination unit 50 determines that abnormality occurs in the spindle system.

As a result, when abnormality occurs in the spindle system, the damage determination unit 50 proceeds to Step S14 and estimates an impact force F which is applied to the spindle portion 24 along the collision direction. The damage determination unit 50 calculates the impact force F by F=Tm+(Mα). Here, Tm is torque which is generated by the motor 16 during the collision, and the damage determination unit 50 calculates Tm on the basis of the motor current value. In addition, M is inertia of a moving object which collides with the spindle portion 24. More specifically, when the collision direction determined by the collision determination unit 46 in Step S7 of the abnormality diagnosis processing described in FIG. 4 is in the X axis direction, the damage determination unit 50 calculates the M by M=(weight of table 10)+(weight of work piece 12). In addition, when the collision direction determined by the collision determination unit 46 is in the Y axis direction, the damage determination unit 50 calculates the M by M=(weight of saddle 26)+(weight of ram 28). Moreover, when the collision direction determined by the collision determination unit 46 is in the Z axis direction, the damage determination unit 50 calculates the M by M=weight of ram 28. In addition, α is the acceleration of the ram 28 detected by the acceleration sensor 38.

Next, the damage determination unit 50 proceeds to Step S15 and determines whether or not the impact force F estimated in Step S14 exceeds a static rated load of the spindle bearing 30. As a result, when the impact force F exceeds a static rated load of the spindle bearing 30, deformation or damage to a degree in which replacement is required is likely to occur in the spindle bearing 30. Accordingly, the damage determination unit 50 proceeds to Step S12, and determines that the spindle bearing 30 is damaged.

In Step S13, when abnormality does not occur in the spindle system, that is, when an alarm denoting that abnormality does not occur in the spindle system is output by the controller controlling the rotation of the spindle 32, or in Step S15, when the impact force F does not exceed the static rated load of the spindle bearing 30 (when the impact force F is the static rated load of the spindle bearing 30 or less), the damage determination unit proceeds to Step S16 and acquires frequency characteristics of the vibration of the ram 28 due to the rotation of the spindle 32. Specifically, the damage determination unit 50 performs frequency analysis in the vibration of the ram 28 due to the rotation of the spindle 32, on the basis of the acceleration data of the ram 28 detected by the acceleration sensor 38. In addition, the damage determination unit 50 acquires peak values of base frequency corresponding to the revolving number of the spindle 32 and high-harmonic frequency with respect to the base frequency.

Next, in Step S17, the damage determination unit 50 determines whether or not the peak values of the base frequency and the high-harmonic frequency in the vibration of the ram 28 acquired in Step S16 exceeds PDmax. PDmax is the maximum peak value assumed when the spindle bearing 30 is not damaged, and is set in advance. When the peak values of the base frequency and the high-harmonic frequency in the vibration of the ram 28 exceed PDmax, the damage determination unit 50 proceeds to Step S12 and determine that the spindle bearing 30 is damaged.

Meanwhile, when the peak values of the base frequency and the high-harmonic frequency in the vibration of the ram 28 do not exceed PDmax (when the peak values are PDmax or less), the damage determination unit 50 proceeds to Step S18 and determines whether or not the frequency characteristics in the vibration of the ram 28 acquired in Step S16 coincide with the frequency characteristics in a normal state. When the base frequency and the high-harmonic frequency in the vibration of the ram 28 acquired in Step S16 are within a certain range from the base frequency and the high-harmonic frequency in the normal state and the peak values of the base frequency and the high-harmonic frequency are within a certain range from the peak values in the normal state, the damage determination unit 50 determines that the frequency characteristics in the vibration of the ram 28 coincide with the frequency characteristics in the normal state.

As a result, the frequency characteristics of the vibration of the ram 28 do not coincide with the frequency characteristics in the normal state, the damage determination unit 50 proceeds to Step S12, and determines that the spindle bearing 30 is damaged.

Meanwhile, when the frequency characteristics of the vibration of the ram 28 coincide with the frequency characteristics in the normal state, the damage determination unit 50 proceeds to Step S19 and determine that the spindle bearing 30 is not damaged.

After Steps S12 and S19, the damage determination unit 50 ends the bearing damage determination processing, and returns to a main routine.

Next, ram damage determination processing which is performed by the damage determination unit 50 in Step S9 of the abnormality diagnosis processing will be described. FIG. 6 is a flow chart of the ram and saddle damage determination processing.

Figure 6:
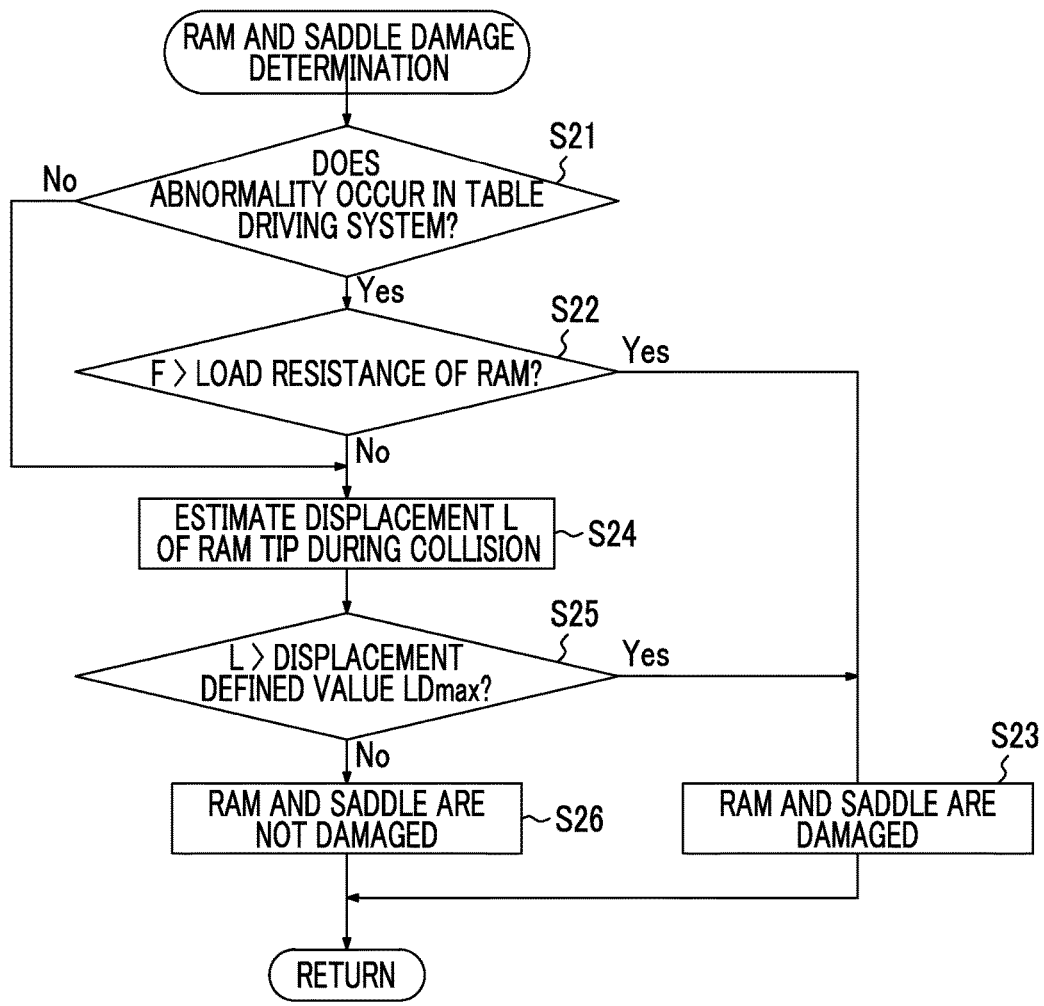
FIG. 6 is a flow chart of ram and saddle damage determination processing which is performed by the abnormality diagnosis device according to the embodiment of the present invention.

As shown FIG. 6, when the ram and saddle damage determination processing starts, in Step S21, the damage determination unit 50 determines whether or not abnormality occurs in a driving system of the table 10. Specifically, when rotation abnormality or rotation loss of the ball screw 6 or overload of the motor 16 is detected by the controller 18, and an alarm denoting that abnormality occurs in the driving system of the table 10 is output, the damage determination unit 50 determines that abnormality occurs in the driving system of the table 10.

As a result, when abnormality occurs in the driving system of the table 10, the damage determination unit 50 proceeds to Step S22 and determines whether or not the impact force F estimated in Step S14 of the bearing damage determination processing described in FIG. 5 exceeds load resistance of the ram 28. As a result, when the impact force F exceeds the load resistance of the ram 28, deformation or damage of a degree to which repair is required is likely to occur in the ram 28. Accordingly, the damage determination unit 50 proceeds to Step S23 and determines that the ram 28 is damaged.

Meanwhile, in Step S21, when abnormality does not occur in the driving system of the table 10, that is, alarm denoting that abnormality does not occur in the driving system of the table 10 is not output by the controller 18, or in Step S22, when the impact force F does not exceed the load resistance of the ram 28 (when the impact force F is the load resistance or less of the ram 28), the ram deformation amount estimation unit 48 proceeds to Step S24, and estimates the amount of displacement L of the tip of the ram 28 during the collision.

Figure 7:
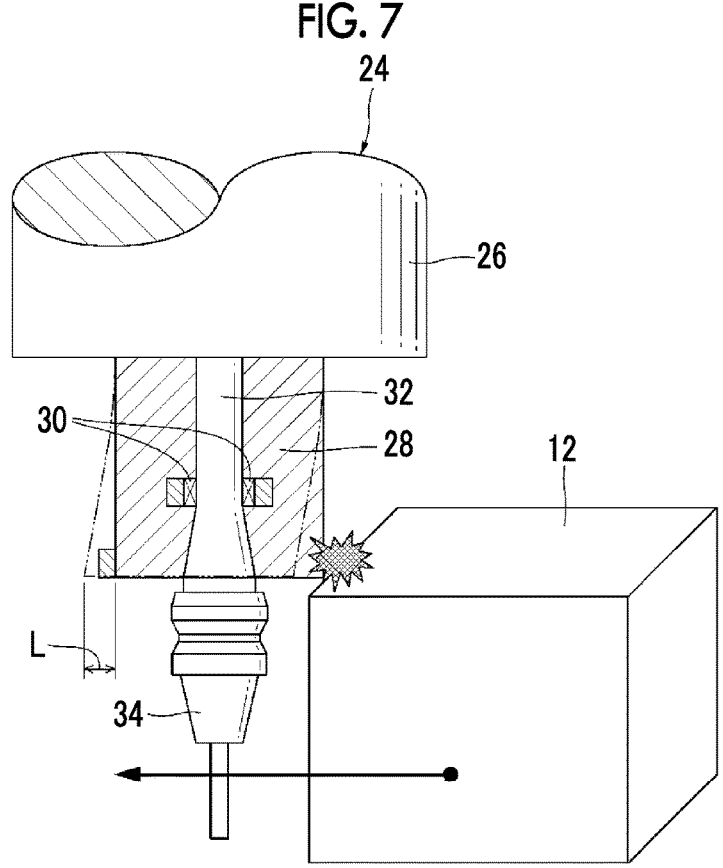
FIG. 7 is a partially enlarged side view of a spindle portion of the machine tool to which the abnormality diagnosis device according to the embodiment of the present invention is applied, and a view showing a ram which is deformed by a collision.

FIG. 7 is a partially enlarged side view showing the ram 28 which is deformed by the collision. If the work piece 12 installed on the moving table 10 collides with the ram 28, as shown in a dashed line in FIG. 7, the ram is deformed along the collision direction. The ram deformation amount estimation unit 48 estimates the amount of displacement L of the tip of the ram 28 during the collision.

Figure 8:
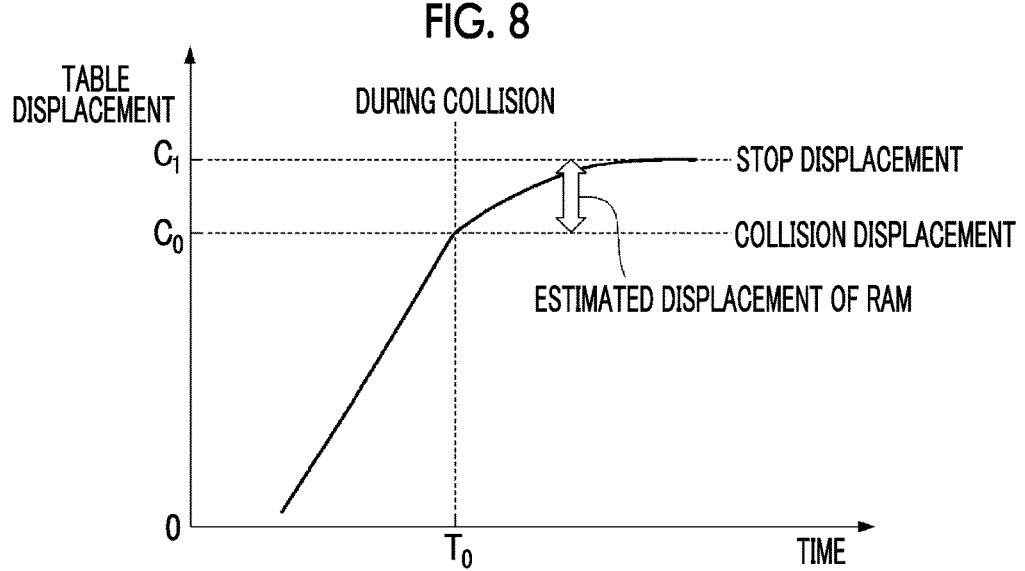
FIG. 8 is a diagram showing a temporal change of a position of a table before and after the collision.

FIG. 8 is a diagram showing a temporal change of the position of the table 10 before and after the collision. In FIG. 8, a horizontal axis indicates time, and a vertical axis indicates the position of the table 10.

As shown in FIG. 8, a point in time $T_0$ when the movement speed (that is, inclination in the temporal change in the position of the table 10) of the table 10 is changed is the time of the collision. The ram deformation amount estimation unit 48 calculates a distance between a position $C_0$ of the table 10 during the collision and a stopping position $C_1$ at which the position of the table 10 is not changed on the basis of the position feedback data, and estimates the calculated distance as the amount of displacement L of the tip of the ram 28 during the collision.

Next, the damage determination unit 50 proceeds to Step S25 and determines whether or not the amount of displacement L of the tip of the ram 28 estimated by the ram deformation amount estimation unit 48 in Step S24 exceeds LDmax. LDmax is the maximum amount of displacement of the tip of the ram 28 assumed when the ram 28 and the saddle 26 are not damaged, and is determined in advance in the collision directions such as in the X axis direction, the Y axis direction, and the Z axis direction.

Figure 9:
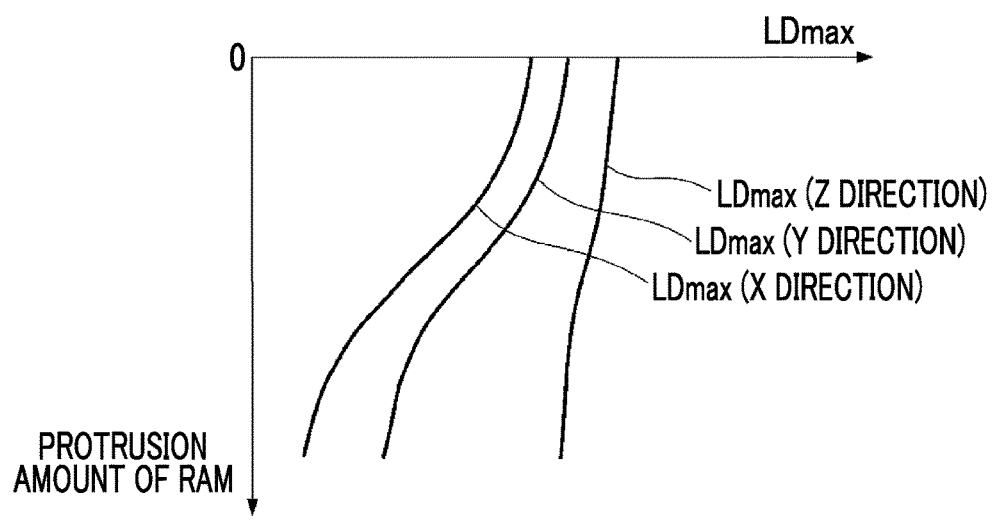
FIG. 9 is a diagram showing a relationship between a protrusion amount of the ram from a saddle during the collision, and a maximum amount of displacement LDmax of a tip of the ram assumed when the ram and saddle are not damaged.

FIG. 9 is a diagram showing a relationship between a protrusion amount of the ram 28 from the saddle 26 during the collision, and LDmax. In FIG. 9, a horizontal axis indicates LDmax, and a vertical axis indicates the protrusion amount of the ram 28 from the saddle 26.

As shown in FIG. 9, since the ram 28 and the saddle are easily damaged even at small displacement as the protrusion amount of the ram 28 from the saddle 26 increases, LDmax decreases.

In addition, when the collision direction is in the X axis direction, compared to other collision directions, since the ram 28 and the saddle 26 are easily damaged even at small displacement, LDmax is the minimum compared to other collision directions. Meanwhile, when the collision direction is in the Z axis direction, compared to other collision directions, since the ram 28 and the saddle 26 are not easily damaged even at a large amount of displacement, LDmax is the maximum compared to other collision directions. When the collision direction is in the Y axis direction, LDmax is an intermediate magnitude between when the collision direction is in the X axis direction and when the collision direction is in Z axis direction.

As a result of Step S25, when the amount of displacement L of the tip of the ram 28 estimated by the ram deformation amount estimation unit 48 in Step S24 exceeds LDmax, the damage determination unit 50 proceeds to Step S23 and determines that the ram 28 and the saddle 26 are damaged.

In Step S25, when the amount of displacement L of the tip of the ram 28 does not exceed LDmax (the amount of displacement L of the tip of the ram 28 is LDmax or less), the damage determination unit 50 proceeds to Step S26 and determines that the ram 28 and the saddle 26 are not damaged.

After Step S23 and Step S26, the damage determination unit 50 ends the ram and saddle damage determination processing and returns to the main routine.

Next, effects by the abnormality diagnosis device 40 and the abnormality diagnosis method of the above-described present embodiment will be described.

First, the collision determination unit 46 determines whether or not the ram 28 or the spindle 32 collides with the work piece 12 on the basis of at least the amount of displacement of the spindle bearing 30 detected by the displacement sensor 36 or the acceleration of the ram 28 detected by the acceleration sensor 38, and when the collision determination unit 46 determines that there is a collision of the ram 28 or the spindle 32, the damage determination unit 50 determines the degree of damage to the spindle bearing 30 on the basis of at least the amount of displacement of the spindle bearing 30, the acceleration of the ram 28, or the frequency characteristics in the vibration of the ram 28 due to the rotation of the spindle 32 obtained from the acceleration of the ram 28.

That is, since the collision determination unit 46 determines whether or not the spindle system collides with the work piece 12, on the basis of the amount of displacement of the spindle bearing 30 which is deformed by the collision of the spindle system, or the acceleration of the ram 28 which is moved by the collision of the spindle system, it is possible to directly determine the presence or absence of the collision. In addition, since the damage determination unit 50 determines the degree of damage to the spindle bearing 30, on the basis of the amount of displacement of the spindle bearing 30 changed according to the degree of damage to the spindle bearing 30, the acceleration of the ram 28, or the frequency characteristics of the vibration of the ram 28, it is possible to securely determine the degree of damage to the spindle bearing 30 due to the collision of the spindle system. Particularly, since the damage determination unit 50 determines the degree of damage to the spindle bearing 30 on the basis of the amount of displacement of the spindle bearing 30, it is possible to directly determine the degree of damage to the spindle bearing 30. In addition, since the damage determination unit 50 determines the degree of damage to the spindle bearing 30 on the basis of the frequency characteristics of the vibration of the ram 28 due to the rotation of the spindle 32, it is possible to strictly determine the degree of damage to the spindle bearing 30 from various aspects such as a base frequency or a peak value.

Moreover, when the collision determination unit 46 determines that the collision of the ram 28 or the spindle 32 occurs, the damage determination unit 50 determines the degrees of damage of the ram 28 and the saddle 26, on the basis of at least the acceleration of the ram 28 detected by the acceleration sensor 38 or the amount of deformation of the ram 28 estimated by the ram deformation amount estimation unit 48.

That is, since the damage determination unit 50 determines the degrees of damage of the ram 28 and the saddle 26 on the basis of the acceleration of the ram 28 or the amount of deformation of the ram 28 changed according to the degrees of damage of the ram 28 and the saddle 26, it is possible to securely determine the degrees of damage of the ram 28 and the saddle 26 due to the collision of the spindle system. Particularly, since the damage determination unit 50 determines the degrees of damage of the ram 28 and the saddle 26 on the basis of the amount of deformation of the ram 28, it is possible to directly determine the degrees of damage of the ram 28 and the saddle 26.

In addition, the ram deformation amount estimation unit 48 estimates the amount of deformation of the ram 28 on the basis of the positional change of the table 10 detected by the position detector 20. That is, since the ram deformation amount estimation unit 48 estimates the amount of deformation of the ram 28 on the basis of the positional change of the table 10 when the work piece 12 installed on the table 10 or the table 10 itself collides with the spindle system, it is possible to securely estimate the amount of deformation of the ram 28 without using a sensor which directly detects the amount of deformation of the ram 28.

REFERENCE SIGNS LIST

1: machine tool
2: bed
4: bracket
6: ball screw
8: nut
10: table
12: work piece
14: reduction gear
16: motor
18: controller
20: position detector
22: pulse coder
24: spindle portion
26: saddle
28: ram
30: spindle bearing
32: spindle
34: tool
36: displacement sensor
38: acceleration sensor
40: abnormality diagnosis device
42: abnormality diagnosis unit
44: storage unit
46: collision determination unit
48: ram deformation amount estimation unit
50: damage determination unit

The invention claimed is:

1. An abnormality diagnosis device for a machine tool in which a tool for machining a work piece is attached to a spindle, the spindle is supported by a bearing, and the bearing is supported by a ram, and the ram is supported by a saddle, comprising:

a displacement sensor configured to detect an amount of displacement of the bearing;

an acceleration sensor configured to detect an acceleration of the ram;

a first data processor configured to determine whether the ram or the spindle collides with the work piece on the basis of at least the amount of displacement of the bearing detected by the displacement sensor or the acceleration of the ram detected by the acceleration sensor; and a second data processor configured to determine a degree of damage to the bearing on the basis of a base frequency, a high-harmonic frequency and peak values of the base frequency and the high-harmonic frequency of a vibration of the ram due to a rotation of the spindle obtained from the acceleration of the ram when the first data processor determines that the ram or the spindle collides with the work piece; and a third data processor configured to estimate an amount of displacement of a tip of the ram, wherein the second data processor determines that the ram and the saddle are damaged when the amount of displacement of the tip of the ram estimated by the third data processor exceeds an assumed maximum amount of displacement of the tip under the condition that the ram and the saddle are not damaged, and wherein the assumed maximum amount of displacement is predetermined such that it decreases as an protrusion amount of the ram from the saddle increases.

2. The abnormality diagnosis device for a machine tool according to claim 1, wherein the machine tool includes a moving body which moves in a direction orthogonal to an axial direction of the spindle, and a position detector is configured to detect a position of the moving body, and wherein the third data processor estimates the amount of displacement of the tip of the ram on the basis of a positional change of the moving body detected by the position detector.

3. An abnormality diagnosis method for a machine tool in which a tool for machining a work piece is attached to a spindle, the spindle is supported by a bearing, and the bearing is supported by a ram, and the ram is supported by a saddle, comprising:

a step of detecting an amount of displacement of the bearing;

a step of detecting an acceleration of the ram;

a step of determining whether the ram or the spindle collides with the work piece on the basis of at least the detected amount of displacement of the bearing or the detected acceleration of the ram;

a step of determining a degree of damage to the bearing, on the basis of a base frequency, a high-harmonic frequency and peak values of the base frequency and the high-harmonic frequency of a vibration of the ram due to a rotation of the spindle obtained from the acceleration of the ram, when it is determined that the ram or the spindle collides with the work piece;

a step of estimating an amount of displacement of a tip of the ram; and a step of determining that the ram and the saddle are damaged when the amount of displacement of the tip of the ram exceeds an assumed maximum amount of displacement of the tip under the condition that the ram and the saddle are not damaged, wherein the assumed maximum amount of displacement is predetermined such that it decreases as an protrusion amount of the ram from the saddle increases.

* * * * *